Patented Aug. 16, 1949

2,478,990

UNITED STATES PATENT OFFICE 2,478,990

PREPARATION OF ATROPONITRILE

Joseph Frederic Walker, Westfield, N. J., assignor to E. I. du Pont de Nemours & Company, Wilmington, Del., a corporation of Delaware No Drawing. Application October 18, 1947, Serial No. 780,763

12 Claims. (Cl. 260—465)

This invention relates to the production of atroponitrile and an atroponitrile dimer, and more particularly it relates to a new and improved process for the production of such nitriles.

This is a continuation-in-part of my copending application Serial No. 627,971, filed November 10, 1945, now abandoned.

Atroponitrile has been produced heretofore by pyrolysis of an aromatic methyl ketone cyanhydrin acetate. In accordance with the process outlined in Clifford et al. Patent No. 2,362,049, acetophenone, for example, is treated with hydrogen cyanide to obtain acetophenone cyanhydrin which in turn is acetylated to produce acetophenone cyanhydrin acetate, the latter being subjected to pyrolysis at a temperature of 500° C. to 600° C. to remove acetic acid and thereby obtain atroponitrile. This process involves three separate steps and is obviously expensive and cumbersome.

It is an object of this invention to produce atroponitrile and a crystalline atroponitrile dimer melting at approximately 123° C. in a simple, efficient manner.

Other objects of the invention will appear hereinafter.

The objects of this invention may be accomplished, in general, by reacting phenyl acetonitrile (benzyl cyanide) with formaldehyde in the presence of a strong alkaline catalyst whereby to produce a viscous condensation product. This product can then be pyrolyzed, or, pyrolyzed and dehydrated, to produce the atroponitrile by subjecting the same to vacuum vaporization, preferably flash vacuum vaporization, and condensation.

In carrying out the reaction between phenyl acetonitrile and formaldehyde, the reactants are preferably stirred or agitated during the reaction, and it is preferred to maintain the reaction temperature between room temperature and 100° C. The temperature of the reaction can be controlled by regulating the rate at which the reactants are added, or by cooling, or both.

The formaldehyde is preferably added in the form of paraformaldehyde; however, gaseous formaldehyde or other polyoxymethylene glycol polymers may be used. Aqueous formaldehyde solutions such as the 37% commercial formaldehyde are not useful in the process of this invention since they contain too much water. Although small amounts of water, up to about 15% by weight, can be tolerated in the present process, when an excess of water, i. e., excess over 15%, is present, the strong aqueous alkaline solution causes undue hydrolysis of the nitrile and Cannizzaro reaction of the formaldehyde. The term "formaldehyde" is used throughout the specification and claims in its generic sense to include paraformaldehyde and other polyoxymethylene glycol polymers.

A strong alkaline catalyst is necessary in carrying out the reaction. Alkaline materials having a strength of the order of sodium or potassium alcoholate or sodium or potassium hydroxide are preferred. However, quaternary ammonium bases also are satisfactory. Weaker bases, such as primary, secondary, or tertiary amines or piperidine show little or no catalytic activity. The amount of strong alkaline catalyst may be varied within wide limits. Preferably, sufficient catalyst is added to make the reaction mass alkaline, and more than 10% by weight of the catalyst is unnecessary.

Preferably, the reaction is carried out in the presence of a non-aqueous solvent which is inert to the reaction materials. Lower aliphatic alcohols, for example, methyl, ethyl or propyl alcohol, or lower aliphatic ethers, for example, methyl, ethyl or propyl ether, are suitable solvent media for use in accordance with the present invention.

The production of atroponitrile in accordance with the present invention proceeds in two steps; first, phenyl acetonitrile reacts with formaldehyde to form condensation products, and then these products are pyrolyzed to produce atroponitrile. For example, in the case of the production of alpha phenyl acrylonitrile (atroponitrile), the reaction probably takes place in accordance with the following formulas:

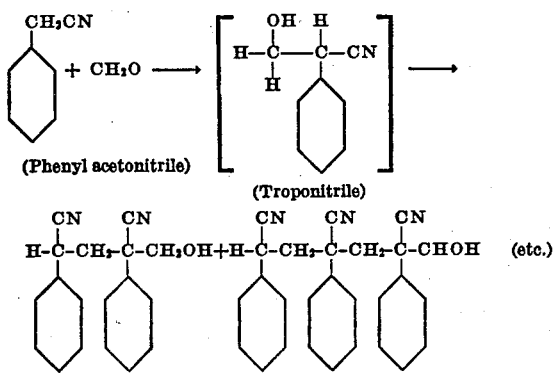

(Troponitrile is probably first formed but then condenses with itself to form a mixture of dimers, trimers, and high polymers which constitute the viscous condensation product referred to above. The complicated nature of the alkaline condensate is indicated by its average molecular weight which ranges from 225 to 375 at reaction temperatures from 25° to 60° C., respectively, whereas the molecular weight of troponitrile is 147.)

Pyrolysis by flash vaporization ⟶ $CH_2=C-CN$

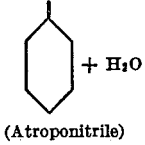 + $H_2O$ (Atroponitrile)

(Under some conditions, it is possible that atroponitrile dimer is also formed in the pyrolytic reactions and passes over unchanged in to the crude atroponitrile distillate from which it later crystallizes with dimer formed by polymerization of monomer.)

The first step, involving the reaction of the aryl acetonitrile with formaldehyde, takes place readily in the presence of a strong alkaline catalyst. In the second step, involving the pyrolysis of the viscous condensation product, care must be taken to prevent or substantially reduce polymerization and polycondensation reactions with formation of resinous products.

The dehydration may be accomplished by vaporizing the methylol derivative of the phenyl acetonitrile under vacuum, the sub-atmospheric pressure employed being sufficiently low to avoid objectionable polymerization. If direct vacuum vaporization is employed, e. g., by heating a body of said derivative at a temperature above the boiling point thereof, it should be carried out at a sub-atmospheric pressure below about 15 mm. Hg, to avoid objectionable polymerization. The direct vacuum vaporization can be carried out in a conventional distillation unit, with a still pot temperature of between 160° C. and 200° C. The distillation vapors will have a temperature of between 95° C. and 105° C. at a pressure of between 5 mm. Hg and 10 mm. Hg. The particular temperature used should be high enough to pyrolyze the condensation product but not so high as to decompose the resulting phenyl acrylonitrile.

It has been found preferable to dehydrate by pyrolysis and to vaporize the pyrolysis products as they are formed. The pyrolysis is, therefore, preferably carried out by flash vaporizing the condensation product by sudden application of heat, then withdrawing the vapors and condensing the same. This can best be accomplished by slowly passing the viscous condensation product into a container maintained at subatmospheric pressure and heated to a temperature materially above the point at which it is rapidly pyrolyzed while withdrawing the vapors and condensing the same as soon as they are formed. The viscous condensation product is passed into the said container at such a slow rate that the same is vaporized substantially instantaneously. The flash pyrolysis vaporization should be carried out at a temperature high enough to pyrolyze the condensation product but not high enough to decompose the resulting atroponitrile. Preferably, the flash vaporization is carried out at a pressure not to exceed 150 mm. Hg, and at a temperature at least 10° C. to 20° C. above the boiling point of atroponitrile. The temperature must not, of course, be so high as to decompose the resulting phenyl acrylonitrile.

The flash vaporization may be carried out in any desired form of apparatus which can be readily evacuated and which can be heated to the desired temperature. For example, the vaporization can be carried out in a Claisen distilling flask provided with a dropping funnel, a thermometer, a water-cooled condenser, and a receiver. The distilling flask can be readily heated by immersing the same in an oil bath kept at the desired temperature. For example, in the flash vaporization of the viscous condensation product to produce atroponitrile, the oil bath is kept at 190° C. to 240° C., and the flask is evacuated to around 5 to 10 mm. Hg. The condensation product is passed into the flask at approximately the rate at which it is vaporized and the vapors of water and atroponitrile are withdrawn and condensed. The flash vaporization can as well be carried out in an evacuated quartz or metal tube, heated in any desired manner, and provided with means for condensing and collecting the vaporized products. By employing flash vaporization under reduced pressure, uniformly high yields of the product are obtained with little objectionable polymerization, whereas direct vacuum distillation sometimes produces erratic results. Polymerization inhibitors such as hydroquinone, copper resinate or iodine may be added to the product prior to pyrolysis by either direct or flash vaporization, if desired.

After the reaction between the phenyl acetonitrile and formaldehyde in the presence of a strong alkaline catalyst, it is usually preferred to neutralize the reaction product with an acid, for example, hydrochloric acid, sulfuric acid, or acetic acid. If a solvent reaction medium has been used in carrying out the reaction, it is then preferred to first strip off, by simple distillation, the solvent before carrying out the vacuum dehydration-distillation.

The present invention is particularly attractive for the production of atroponitrile from phenyl acetonitrile and formaldehyde. Atroponitrile is useful for the production of copolymers with other monomers, for example, butadiene, isoprene, and the like. Furthermore, atroponitrile produced in this manner is converted to an atroponitrile dimer having a melting point of approximately 123° C. on standing at room temperature. This dimerization period can be reduced by subjecting the monomer to ultraviolet light. Atroponitrile dimer is of value as a chemical intermediate since it can be converted to a dibasic acid, a diamide, and diamine for use in the synthesis of polyester and polyamide resins.

The atroponitrile dimer produced in accordance with this invention is a colorless crystalline compound which is stable over long periods of time without danger of further polymerization. It melts at approximately 123° C. and distills with partial decomposition in the range 185° C. to 215° C. at 1.0 to 2.0 mm. It is substantially insoluble in water, sparingly soluble in ether and benzene, but may be dissolved in hot ethanol, ethyl acetate and acetic acid. It is neutral in reaction and does not dissolve in dilute alkalis or acids. It dissolves readily in concentrated sulfuric acid from which it is precipitated on dilution.

The empirical formula of atroponitrile dimer ($C_{18}H_{14}N_2$) is demonstrated by analyses for carbon, hydrogen, and nitrogen.

|  | Calc. for $C_{18}H_{14}N_2$ | Found |
| --- | --- | --- |
| Per Cent Carbon | 83.69 | 83.75 |
| Per Cent Hydrogen | 5.47 | 5.55 |
| Per Cent Nitrogen | 10.84 | 10.66 |
|  | 100.00 | 99.96 |

Its chemical properties show that it is a dinitrile, probably diphenyl dicyanocyclobutane,

$$C_4H_4(C_6H_5)_2(CN)_2$$

Prolonged treatment with 60% to 90% sulfuric acid causes hydration of the dinitrile to a diamide which is readily hydrolyzed by alkalis to a dicarboxylic acid. On refluxing with concentrated aqueous sodium hydroxide, the atroponitrile dimer gradually reacts with liberation of ammonia to produce a dicarboxylic acid which dissolved in the alkali and is precipitated when the solution is acidified. This acid, probably diphenyl cyclobutane dicarboxylic acid, melts at 204° C. to 206° C. and gives the following values for its molecular weight and neutralization equivalent.

|  | Found | Calculated for $C_4H_4(C_6H_5)_2(COOH)_2$ |
| --- | --- | --- |
| Molecular Weight | 316 | 296 |
| Neutralization Equivalent | 157 | 148 |

On hydrogenation in ammonia at 110° C. to 130° C. and 1000 to 1500 pounds per square inch pressure in the presence of a nickel catalyst, the dimer is converted to a diamine boiling at 200° C. to 220° C. at 5 mm. On reaction with hydrochloric acid, it gives a diamine hydrochloride melting above 250° C. whose neutralization equivalent, 163, is in good agreement with the calculated value, 169, for $C_4H_4(C_6H_5)_2(CH_2NH_2)_2 \cdot 2HCl$.

There are several probable isomers of the atroponitrile dimer above described. It is well known that cyclobutanes of this type can exist in cis and trans geometric isomers. In one of these, the two phenyl groups will be on the same side of the cyclobutane ring; in the other, they will be on opposite sides. There is also the possibility that an atroponitrile dimer in which the phenyl and nitrile groups are on adjacent carbon atoms in the cyclobutane ring can be formed. This isomer will also have cis and trans forms and, in addition, each of these could exist in optically active d- and l-forms. It is possible that different atroponitrile dimers will be formed from atroponitrile made in this process. Since previously-known methods for the production of atroponitrile fail to indicate the formation of a dimer, it is believed that the crystalline dimer melting at about 123° C. of this invention has not been produced heretofore by a process involving the production of atroponitrile.

The following examples are given to illustrate, in detail, certain preferred procedures for carrying out the process of this invention, it being understood that all the specific details set forth are not necessarily essential to the process.

Example I

Paraformaldehyde, in the amount of 33 grams, was mixed with 50 cc. of methanol in a 500-cc. flask equipped with stirrer, reflux condenser, thermometer and dropping funnel. To this mixture was added 25 cc. of sodium methylate solution prepared by dissolving one gram of sodium in 25 cc. of methanol. This alkaline formaldehyde solution was heated to 55° C. to 60° C. and 117 grams of benzyl cyanide were slowly added, maintaining the temperature at 50° C. to 65° C. After two and one-half hours' reaction time, the theoretical amount of formaldehyde had been consumed and the reaction mixture was neutralized by adding a solution of hydrogen chloride in methanol. After stripping off methanol, the viscous product was flash vaporized at a temperature of 200° C. and a pressure of 4 to 6 mm. Hg, and the vapors condensed, yielding 115.6 grams of atroponitrile. This corresponds to 89.6% of theory. The boiling point of the product was 95° C. to 98° C. at 4 to 6 mm. pressure and it had a refractive index $n_D^{25}=1.5490$.

Example II

Paraformaldehyde, in the amount of 32.5 grams, was mixed with 75 cc. of ether in a flask equipped as in Example I. One gram of sodium dissolved in 10 cc. of methanol was added and the mixture stirred at 35° C. to 40° C. One hundred and seventeen (117) grams of benzyl cyanide was added slowly while maintaining the temperature at 30° C. to 35° C. After eighteen hours at this temperature, reaction was substantially complete and the excess caustic was neutralized with a solution of hydrogen chloride in methanol. After stripping off the solvent, the reaction mixture was direct vacuum distilled with the still pot temperature at about 195° C. and at a pressure between 6 and 10 mm. Hg, yielding 27.2 grams atroponitrile boiling at 90° C. to 110° C. at 8 mm. pressure.

Example III

Paraformaldehyde, in the amount of 16 grams, was mixed with a solution of 0.5 gram of sodium in 10 cc. of methanol in a flask equipped as in Example I. The temperature was raised to 60° C. and 0.25 gram of copper resinate was added. Then, 50 grams of benzyl cyanide was added slowly, keeping the temperature below 70° C. After two and one-half hours at 60° C. to 70° C., approximately 90% of the theoretical amount of formaldehyde had been consumed although particles of paraformaldehyde remained in suspension. The very viscous reaction mixture was flash vaporized and condensed as in Example I, yielding 47.7 grams of atroponitrile, boiling at 95° C. to 102° C. at 5 to 6 mm. pressure. This corresponds to 74% yield of product.

Example IV

Paraformaldehyde, in the amount of 31.5 grams, was added to 50 cc. absolute ethanol in a flask equipped as in Example I. One gram of sodium dissolved in 25 cc. absolute ethanol was added and the reaction mixture stirred at 35° C. to 45° C. until a homogeneous solution was obtained. One-half (0.5) gram of copper resinate was added, then 117 grams of benzyl cyanide were slowly added while maintaining the temperature at 35° C. to 40° C. After two hours, the reaction was substantially complete and the excess caustic was neutralized with alcoholic hydrogen chloride. After stripping off ethanol, the reaction mixture was direct vacuum distilled with a still pot temperature of about 190° C. and a pressure of between 6 and 10 mm. Hg, yielding 69.2 grams of atroponitrile, boiling at 100° C. to 120° C. at 10 to 20 mm. pressure.

*Example V*

Paraformaldehyde, in the amount of 17 grams, was mixed with 50 cc. of methanol in a flask equipped as in Example I. Three-quarters of a gram of potassium dissolved in 12 cc. of methanol was added to the reaction mixture and stirred at 35° C. to 40° C. until a homogeneous solution was obtained. Fifty-five (55) grams of benzyl cyanide was slowly added with stirring, maintaining the temperature at 35° C. to 40° C. After twenty hours at 40° C., the reaction was substantially complete and the excess caustic was neutralized with a solution of hydrogen chloride in methanol. After stripping off methanol, the reaction mixture was direct vacuum distilled with a still pot temperature of about 195° C. and at a pressure of between 6 and 10 mm. Hg, yielding 33.6 grams of atroponitrile, boiling at 90° C. to 95° C. at 4 to 6 mm. pressure. The product had a refractive index $n_D^{28} = 1.5478$.

*Example VI*

Paraformaldehyde, in the amount of 35 grams, was added to 75 cc. of methanol in a flask equipped as in Example I. Five (5) cc. of trimethylbenzyl ammonium hydroxide (40% aqueous solution) was added and the mixture stirred at 40° C. until homogeneous. One hundred and seventeen (117) grams of benzyl cyanide was slowly added and the temperature was kept at 40° C. for eighteen hours. At this time, reaction was substantially complete and the reaction mixture was neutralized with a solution of hydrogen chloride in methanol. After stripping off methanol, the reaction mixture was direct vacuum distilled under the same conditions as in Example V, yielding 11.4 grams of atroponitrile, boiling at 100° C. to 110° C. at 10 mm. pressure.

*Example VII*

Paraformaldehyde, in the amount of 35 grams (1.1 mole) was dissolved in a solution of 1.0 gram sodium in 75 ml. of methanol and the solution heated to 50° C. One mole (117 grams) of benzyl cyanide was added to this solution as rapidly as possible without letting the temperature go above 60° C. Cooling with an ice bath may be necessary to maintain the required temperature at first. After the exothermic reaction had subsided, the mixture was heated to keep the temperature at between 55° C. and 60° C. until 97% to 99% of the paraformaldehyde had reacted as shown by titrating a sample of the mixture by the well-known hydroxylamine hydrochloride method. The solution was then neutralized with a methanolic solution of dry hydrogen chloride, using phenophthalein as an indicator and the methanol removed by vacuum stripping.

The resulting crude condensation product was flash distilled by dropping it slowly into a 500 ml. Claisen flask which had been evacuated to 5 to 10 mm. pressure, and immersed in an oil bath at 220° C. to 240° C. A yield of about 85% of crude distillate was obtained. After standing several days at room temperature, atroponitrile dimer melting at about 123° C. crystallized from this distillate. The crystallization can be accelerated by seeding with crystalline dimer and stirring occasionally. After filtering and washing the crystals with a small quantity of cold methanol, a yield of about 30% of crude dimer was obtained. This product may be further purified by recrystallization from acetic acid.

*Example VIII*

Approximately 20 grams of crude atroponitrile was treated with approximately 0.1% of benzoyl peroxide. Half of this material was then placed under an ultra-violet light radiating sun lamp, whereas the other half was heated at approximately 100° C. After twenty-four hours, the material exposed to the sun lamp began to precipitate crystalline dimer. The monomer which was heated on the sand bath changed to a reddish brown non-crystalline resin after four days' exposure. The results demonstrate that benzoyl peroxide has little effect in accelerating dimerization and that dimerization proceeds best at low temperatures.

Throughout the specification and claims, any reference to parts, proportions or percentages, refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

What is claimed is:

1. The process for the production of atroponitrile which comprises reacting phenyl acetonitrile with formaldehyde at a temperature between room temperature and 100° C. in the presence of a non-aqueous, non-reactive solvent medium and an alkaline catalyst having an alkalinity at least as great as a material taken from the group consisting of sodium hydroxide, potassium hydroxide, sodium alcoholate, potassium alcoholate, and quaternary ammonium bases, and pyrolyzing the resultant product by vaporization at sub-atmospheric pressure.

2. The process for the production of atroponitrile which comprises reacting phenyl acetonitrile with formaldehyde at a temperature between room temperature and 100° C. in the presence of a non-aqueous, non-reactive solvent medium and an alkaline catalyst having an alkalinity at least as great as a material taken from the group consisting of sodium hydroxide, potassium hydroxide, sodium alcoholate, potassium alcoholate, and quaternary ammonium bases, and pyrolyzing the resultant product by flash vaporization at sub-atmospheric pressure.

3. The process for the production of atroponitrile which comprises reacting phenyl acetonitrile with formaldehyde at a temperature between room temperature and 100° C. in the presence of a non-aqueous, non-reactive solvent medium and an alkaline catalyst having an alkalinity at least as great as a material taken from the group consisting of sodium hydroxide, potassium hydroxide, sodium alcoholate, potassium alcoholate, and quaternary ammonium bases, the reaction mass containing less than 15% water, and pyrolyzing the resultant product by vaporization at sub-atmospheric pressure.

4. The process for the production of atoponitrile which comprises reacting phenyl acetonitrile with formaldehyde at a temperature between room temperature and 100° C. in the presence of a non-aqueous, non-reactive solvent medium and an alkaline catalyst having an alkalinity at least as great as a material taken from the group consisting of sodium hydroxide, potassium hydroxide, sodium alcoholate, potassium alcoholate, and quaternary ammonium bases, the reaction mass containing less than 15% water, and pyrolyzing the resultant product by flash vaporization at sub-atmospheric pressure.

5. The process for the production of atoponitrile which comprises reacting phenyl acetonitrile with formaldehyde at a temperature between room temperature and 100° C. in the presence of a non-aqueous, non-reactive solvent medium and an alkaline catalyst having an alkalinity at least as great as a material taken from the group consisting of sodium hydroxide, potassium hydroxide, sodium alcoholate, potassium alcoholate, and quaternary ammonium bases, removing the solvent medium, and pyrolyzing the resultant product by flash vaporization at sub-atmospheric pressure.

6. The process for the production of atoponitrile which comprises reacting phenyl acetonitrile with formaldehyde at a temperature between room temperature and 100° C. in the presence of a lower aliphatic alcohol and an alkaline catalyst having an alkalinity at least as great as a material taken from the group consisting of sodium hydroxide, potassium hydroxide, sodium alcoholate, potassium alcoholate, and quaternary ammonium bases, removing said alcohol, and pyrolyzing the resultant product by flash vaporization at sub-atmospheric pressure.

7. The process for the production of atoponitrile which comprises reacting phenyl acetonitrile with formaldehyde at a temperature between room temperature and 100° C. in the presence of a lower aliphatic ether and an alkaline catalyst having an alkalinity at least as great as a material taken from the group consisting of sodium hydroxide, potassium hydroxide, sodium alcoholate, potassium alcoholate, and quaternary ammonium bases, removing said ether, and pyrolyzing the resultant product by flash vaporization at sub-atmospheric pressure.

8. The process for the production of atoponitrile which comprises reacting phenyl acetonitrile with formaldehyde at a temperature between room temperature and 100° C. in the presence of a non-aqueous, non-reactive solvent medium and sodium alcoholate, the reaction mass containing less than 15% water, and pyrolyzing the resultant product by flash vaporization at sub-atmospheric pressure.

9. The process for the production of atoponitrile which comprises reacting phenyl acetonitrile with formaldehyde at a temperature between room temperature and 100° C. in the presence of a non-aqueous, non-reactive solvent medium and an alkaline catalyst having an alkalinity at least as great as a material taken from the group consisting of sodium hydroxide, potassium hydroxide, sodium alcoholate, potassium alcoholate, and quaternary ammonium bases, neutralizing the product of the reaction, and pyrolyzing the product by flash vaporization at sub-atmospheric pressure.

10. The process for the production of atoponitrile which comprises reacting phenyl acetonitrile with formaldehyde at a temperature between room temperature and 100° C. in the presence of a non-aqueous, non-reactive solvent medium and an alkaline catalyst having an alkalinity at least as great as a material taken from the group consisting of sodium hydroxide, potassium hydroxide, sodium alcoholate, potassium alcoholate, and quaternary ammonium bases, neutralizing the products of the reaction, removing said solvent, and pyrolyzing the product by flash vaporization at sub-atmospheric pressure.

11. The process for the production of atoponitrile which comprises reacting phenyl acetonitrile with formaldehyde at a temperature between room temperature and 100° C. in the presence of a non-aqueous, non-reactive solvent medium and an alkaline catalyst having an alkalinity at least as great as a material taken from the group consisting of sodium hydroxide, potassium hydroxide, sodium alcoholate, potassium alcoholate, and quaternary ammonium bases, neutralizing the products of the reaction, removing said solvent by distillation, and pyrolyzing the product by flash vaporization at sub-atmospheric pressure.

12. The process for the production of an atoponitrile dimer which comprises reacting phenyl acetonitrile with formaldehyde at a temperature between room temperature and 100° C. in the presence of a non-aqueous, non-reactive solvent medium and an alkaline catalyst having an alkalinity at least as great as a material taken from the group consisting of sodium hydroxide, potassium hydroxide, sodium alcoholate, potassium alcoholate, and quaternary ammonium bases, the reaction mass containing less than 15% water, pyrolyzing the resultant product by flash vaporization at sub-atmospheric pressure, and permitting the pyrolyzed product to stand until atoponitrile dimer crystallizes therein.

JOSEPH FREDERIC WALKER.

REFERENCES CITED

The following references are of record in the file of this patent:

UNITED STATES PATENTS

| Number | Name | Date |
| --- | --- | --- |
| 2,208,328 | Lichty | July 16, 1940 |
| 2,286,363 | Hechenbleikner | June 16, 1942 |
| 2,364,422 | Brooks | Dec. 5, 1944 |
| 2,386,586 | Brant et al. | Oct. 9, 1945 |

FOREIGN PATENTS

| Number | Country | Date |
| --- | --- | --- |
| 85,230 | Germany | Jan. 23, 1896 |

OTHER REFERENCES

Brann, Ber. Deut. Chem., vol. 53B, page 1409, (1920).

Adler, Chem. Abstracts, vol. 37, cols. 345–347 (1943) (Abstract of article pub. 1938–1939).